May 18, 1926.
E. HUTCHENS
1,584,941
TIRE VULCANIZING APPARATUS
Filed March 10, 1924　　2 Sheets-Sheet 1
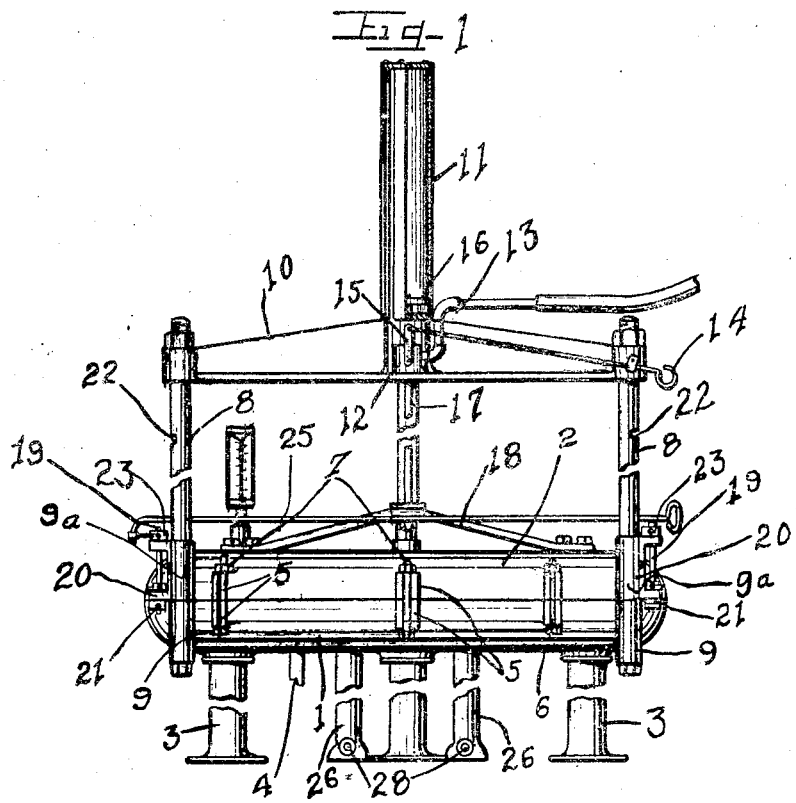
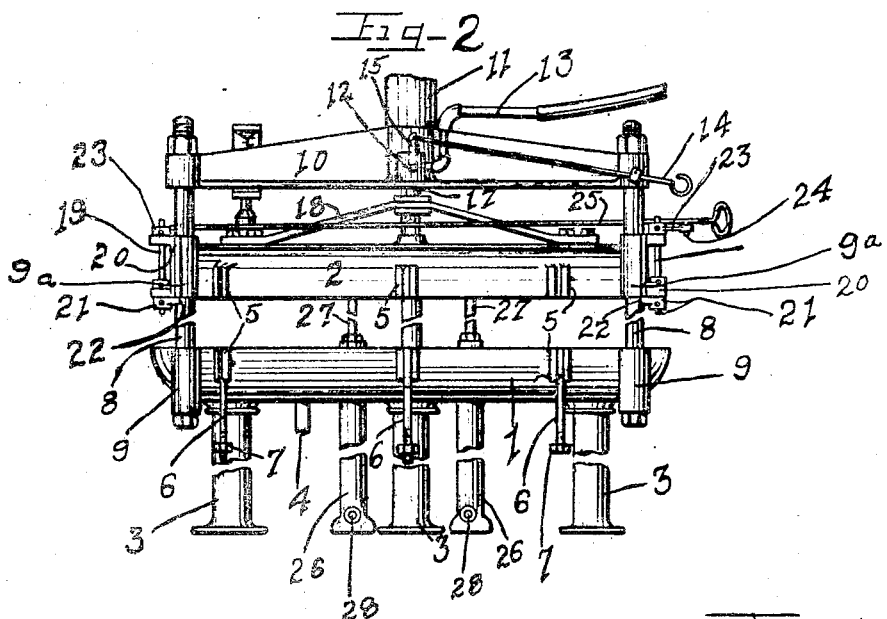
Witnesses
Inventor
Edward Hutchens
by Charles W. Fill
Attys.

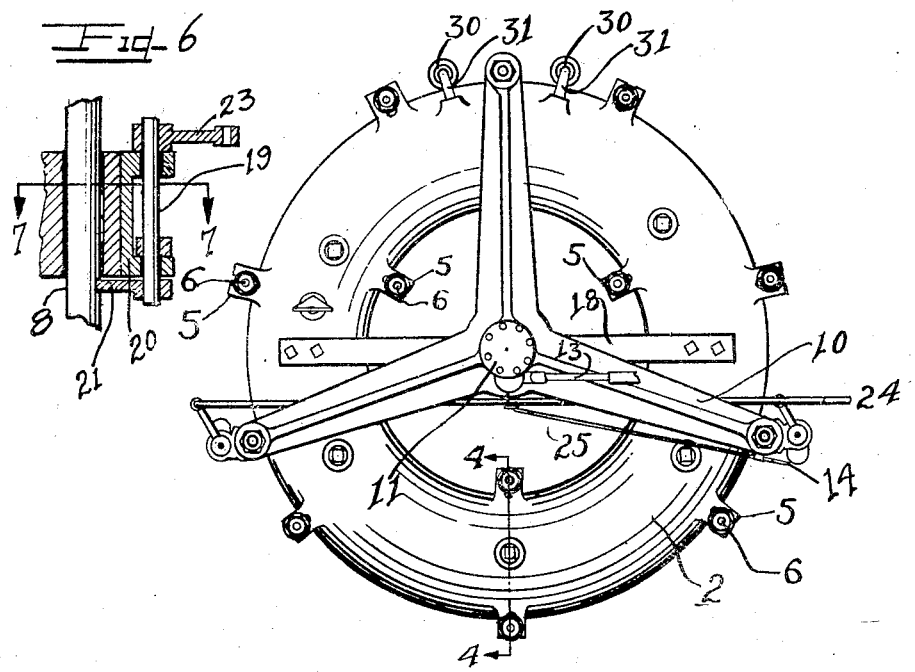
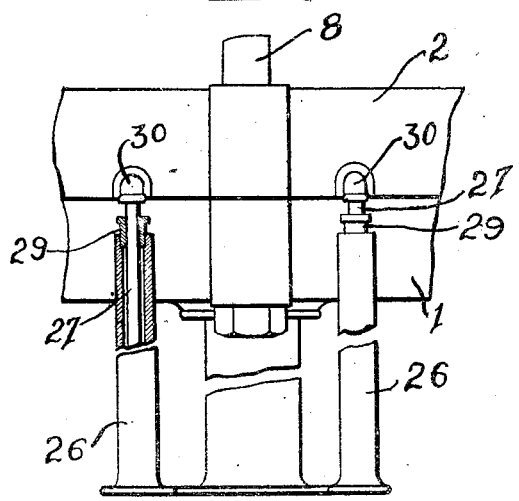
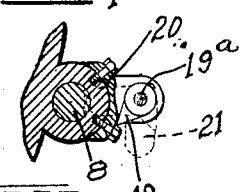

Patented May 18, 1926.

1,584,941

UNITED STATES PATENT OFFICE.

EDWARD HUTCHENS, OF MILWAUKEE, WISCONSIN.

TIRE-VULCANIZING APPARATUS.

Application filed March 10, 1924. Serial No. 698,071.

This invention relates to a tire vulcanizing apparatus involving a stationary section and a movable section which are adapted to be brought together for forming an inclosed chamber for enclosing a mold during the vulcanizing of the tire.

It is an object of this invention to provide means in connection with such an apparatus for raising and lowering the movable vulcanizer section, properly supporting the same for reciprocating movements, holding the same in elevated position, and locking the sections together.

It is a further object of this invention to provide expansible means in connection with such an apparatus for admitting steam to the movable vulcanizer section.

With these and other objects in view, which will become more apparent in the following description and disclosures, this invention comprises the novel mechanism and combinations hereinafter described and more particularly pointed out and defined in the appended claim.

In the accompanying drawings which illustrate a preferred embodiment of this invention and in which similar reference numerals refer to similar features of the different views.

Fig. 1 is an elevational view of my improved vulcanizing apparatus showing the movable section in lowered position.

Fig. 2 is a view similar to Fig. 1 showing the movable vulcanizing section in elevated position with a part of the air cylinder omitted.

Fig. 3 is a top plan view of the vulcanizing apparatus.

Fig. 4 is a sectional view upon the line 4—4 of Fig. 3.

Fig. 5 is an enlarged fragmentary elevational view illustrating certain features.

Fig. 6 is an enlarged section through one of the locking members.

Fig. 7 is a sectional view upon the line 7—7 of Fig. 6.

In referring to the drawing, the numeral 1 represents the stationary section of the vulcanizer, which is substantially an annular concave metal member designed to receive the lower part of a mould. A movable section 2 similar in contour to the stationary section 1 is adapted to fit upon the said stationary section for encompassing the upper part of the mould and thuswise confining the mould in an enclosed chamber.

The stationary section which in the present instance is shown as the lower section, is suitably supported upon legs or standards 3, and is provided with a steam inlet pipe 4. Grooved projections or lugs 5 are formed at suitably and similarly spaced intervals upon the inner and outer peripheries of the two sections.

The grooves in the lugs of the upper section are designed for alinement with the corresponding grooves in the lugs of the lower section for receiving the locking bolts 6 which are pivoted to the lower section so that they can swing in vertical planes from a pendant position to a vertical upstanding position; the upper ends of said bolts being provided with nuts 7 for overlapping the top of the lugs on the movable section whereby the two sections may be firmly clamped together, as shown in Figs. 1 and 3.

A plurality of guide rods or posts 8 are secured at suitable intervals around the periphery of the lower section. In the present instance bearing sockets 9 are formed upon the periphery of the lower section in which the guide rods are firmly held so that they are not liable to cant from a true vertical position. The upper movable section 2 is provided with substantially similar sockets 9ª which slidingly receive the guide rods 8 whereby the upper section is accurately guided so that the same may be properly seated upon the lower section. The upper ends of these guide rods are rigidly connected by a three arm cross head or spider 10 clearly shown in Fig. 3. The hub or central part of the spider is provided with a cylindrical recess for securing the lower end of a cylinder 11 which is provided with a valve structure denoted as a whole by the reference numeral 12 into which a fluid pipe 13 extends. The valve per se which may be of any well known rotary character is adapted to be operated by means of a rod or link 14 supported upon the spider and connected to a crank arm 15 which in turn is connected axially of the valve as is common and well known.

A piston 16 reciprocates within the cylinder, and is provided with a depending rod 17 which extends through the lower end of the cylinder and through the spider. The lower end of this piston rod is fastened to an upwardly bowed metal supporting member 18 attached at its ends to the upper section 2. The point of attachment of the piston rod to the member 18 is preferably reinforced by attaching upper and lower metal plates to said member 18 and providing an aperture through the three thicknesses of metal for receiving the piston rod which is shown as having a nut upon its lower end overlapping the aperture. It is therefore evident that as the piston rod is raised, the upper section will be elevated.

Mechanism has been provided for locking the movable section in elevated position. The illustrated embodiment of this mechanism comprises a pair of rotatable rods 19 mounted in suitable brackets 20 attached to guide sockets 9ª. These rods have right angled engaging dogs 21 at their lower ends adapted for engaging in notches 22 in the upper portions of the guide rods 8 when the movable vulcanizer section is elevated. Crank arms 23 are secured upon the upper ends of the rod 19. A link 25 is pivotally connected at one end to a crank arm 23 and is provided with a bearing pin 24 near its other end for engaging an aperture in the other crank arm 23. It will be evident that as the rod 25 is reciprocated, the dogs 21 will be rotated into and out of the notches. And to properly limit the rotation of the rods 19 they are provided with stops 19ª designed to abut the bracket 20.

For the purpose of admitting steam into the upper movable section, a pair of telescopically adjustable or expansible pipes have been provided. Each pipe comprises an outer section 26, into which steam may be admitted through an aperture 28 (Figs. 1 and 2) and an inner section 27 slidingly supported in a gasket 29 or the like in the upper end of the outer pipe section 26. The upper ends of the inner sections 27 are provided with suitable elbow couplings 30 which are connected by suitable short pipe sections 31 (Fig. 3) with the upper vulcanizer section 2. As the upper section is raised or lowered the inner pipe sections 27 will slide relatively to the outer pipe sections 26 as is obvious.

In using this vulcanizer, a mobile fluid such as air is admitted to the cylinder 11 through the pipe 13, for acting against the bottom of the piston for elevating the upper vulcanizer section assuming that the same has been in lowered position with the locking bolts 6 in pendant positions. When the upper section has been elevated to the position shown in Figure 2, the dogs 21 may be rotated to enter the notches 22 and lock the upper section in elevation position. The air valve may then be closed and the tire mould may be placed in the lower section or different linings may be placed within the upper and lower vulcanizing sections to vary the size of the vulcanizer since the two sections are designed for such a purpose; Figure 3 showing the bolts for securing such linings. When the mold has been properly placed in the lower section, the link may be operated for releasing the dogs 21 allowing the upper vulcanizer section to slide down upon the lower section. The locking bolts 6 may then be swung upwardly into the grooves of the lugs 5 with the nuts 7 swinging over the top of the lugs on the upper section 2. Then by tightening the nuts, the two sections of the vulcanizer will be firmly clamped together. The steam may then be admitted to the vulcanizer through the pipes 4 and 26 as previously explained.

I am aware that numerous details of construction may be varied through a wide range without departing from the principles of this invention, and I therefore do not purpose limiting the patent granted otherwise than necessitated by the prior art.

I claim as my invention:

In a vulcanizer, a lower stationary section, guide rods extending upwardly from said section, an upper section having guide sockets for slidably receiving said guide rods, power operated means for raising said upper section, brackets secured to a pair of said guide sockets, rods rotatably mounted in said brackets, dogs secured to the lower ends of said rods, a pair of said guide rods having notches for locking engagement with said dogs and means for simultaneously rotating said rods to lock said upper section in elevated position.

In testimony whereof I have hereunto subscribed my name.

EDWARD HUTCHENS.